United States Patent [19]
Obata

[11] Patent Number: 5,413,492
[45] Date of Patent: May 9, 1995

[54] TRANSMISSION APPARATUS BETWEEN ROTARY BODY AND FIXED BODY

[75] Inventor: Ken Obata, Tokyo, Japan

[73] Assignee: The Furukawa Electric Co., Ltd., Japan

[21] Appl. No.: 113,107

[22] Filed: Aug. 30, 1993

[30] Foreign Application Priority Data

Sep. 4, 1992 [JP] Japan .............................. 4-067930 U

[51] Int. Cl.⁶ .......................................... H01R 35/02
[52] U.S. Cl. ...................................... 439/164; 439/15
[58] Field of Search ................................ 439/15, 164

[56] References Cited

U.S. PATENT DOCUMENTS 5,310,356  5/1994  Obata et al. ............................ 439/15

FOREIGN PATENT DOCUMENTS

5234651  9/1993  Japan ..................................... 439/15

Primary Examiner—Gary F. Paumen
Attorney, Agent, or Firm—Staas & Halsey

[57] ABSTRACT

A transmission apparatus used for transmitting electric signals, optical signals, small power, etc. between a rotary body and a fixed body using a flat cable. The apparatus has dummy cables in addition to the flat cable. At least one dummy cable is provided with a stopper member having a projecting portion which projects to the flange portion side of the outer case. Further, a depression portion in which the projecting portion of the stopper member enters is formed at the inner circumference of the flange portion of the outside case. If the inside case is rotated in the rewinding direction, the projecting portion of the stopper member catches on the peripheral wall of the depression portion before the flat cable is completely rewound and therefore no further rotation is possible. That is, by the present transmission apparatus, it is possible to accurately detect "over rotation in the rewinding direction" without damaging the flat cable and the dummy cables. "Over rotation in the winding direction" can be detected by a similar construction.

10 Claims, 13 Drawing Sheets

TRANSMISSION APPARATUS BETWEEN ROTARY BODY AND FIXED BODY

BACKGROUND OF THE INVENTION

1. Field of the Invention

The present invention relates to a transmission apparatus used for transmitting electric signals, optical signals, small power, etc. between a rotary body and a fixed body.

2. Description of the Related Art

Figure 1:
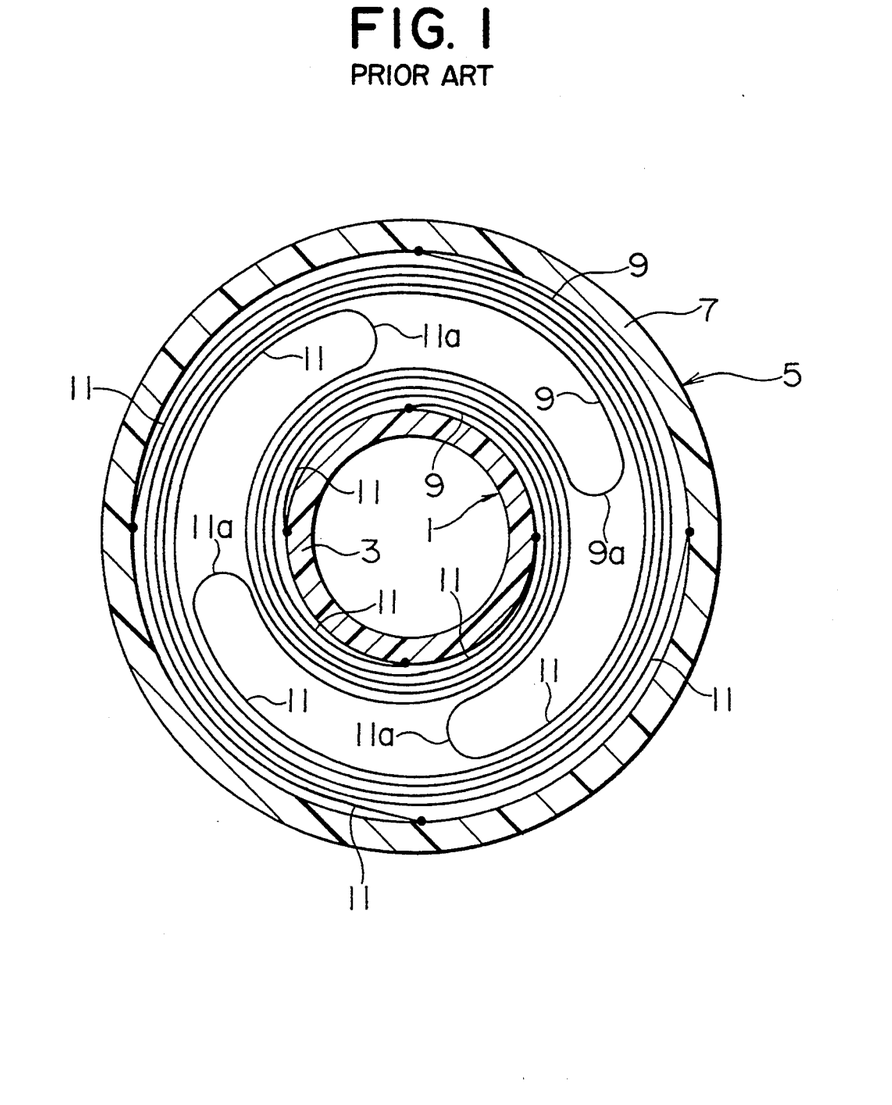
FIG. 1 is a lateral sectional view showing a transmission apparatus between a rotary body and a fixed body meant to be improved by the present invention.

FIG. 1 shows a transmission apparatus between a rotary body and a fixed body meant to be improved by the present invention. This transmission apparatus is provided at its center with an inside case 1 having an inner tubular portion 3 of a hollow cylindrical shape and an outside case 5 having an external tubular portion 7 disposed coaxially around the outer circumference of the inner tubular portion 3. The inside case 1 and the outside case 5 are joined together so as to be relatively rotatable. In the space formed between the inside case 1 and the outside case 5, one flat cable 9 and three dummy cables 11 are accommodated wound upon each other to form winding direction inversion portions 9a and 11a in an intermediate portion in the longitudinal direction.

The inner ends of the flat cable 9 and the dummy cables 11 are affixed to the inner tubular portion 3 and the outer ends to the outer tubular portion 7. The winding direction inversion portions 9a and 11a of the flat cable 9 and the dummy cables 11 are disposed at substantially equal intervals in the circumferential direction.

By the use of the above-mentioned construction, the inside case 1 and the outside case 5 can be rotated relatively within the rotational limitation subject to the length of the flat cable 9 and the dummy cables 11.

Such a transmission apparatus has the inside case 1 serving as the rotary body and the outside case 5 serving as the fixed body connected by a flat cable having conductors in its inside, so it is possible to transmit signals etc. between the rotary body and the fixed body with a high reliability. Therefore, this type of apparatus is used for the transmission of electric signals between, for example, the equipment on the body of an automobile (fixed body) and the equipment (such as air bag systems) on the steering wheel (rotary body).

In such a transmission apparatus, the winding direction inversion portion 9a is provided at the flat cable 9 and therefore it is possible to shorten the length of the flat cable to obtain the same number of rotations, as compared with winding the flat cable in one direction.

The flat cable 9 is constructed of a plurality of conductors arranged in parallel and sandwiched in by two pieces of plastic film joined by an adhesive etc. and has a suitable flexural rigidity and bending elasticity.

On the other hand, each of the dummy cables 11 is constructed of plastic tape having substantially the same flexural rigidity, bending elasticity, and external dimensions as the flat cable 9. These dummy cables 11 are provided as rotating aids so that the flat cable 9 does not jam up or slack during winding when the inside case 1 is being turned.

Note that in the above example, the explanation was made of the case of one flat cable 9 and three dummy cables 11, but the numbers of these may be suitably changed.

The state of FIG. 1 is the state with the flat cable 9 and the dummy cables 11 wound substantially to the same length at the outer circumference of the inner tubular portion 3 and at the inner circumference of the outer tubular portion 7. In other words, the winding direction inversion portions 9a and 11a are positioned at substantially half the lengths of the flat cable 9 and the dummy cables 11.

If the inside case 1 (that is, the inner tubular portion 3) is turned in the counterclockwise direction from this state, the portions of the flat cable 9 and the dummy cables 11 wound on the inside of the outer tubular portion 7 pass through the winding direction inversion portions 9a and 11a and are wound around the outer circumference of the inner tubular portion 3.

Figure 2:
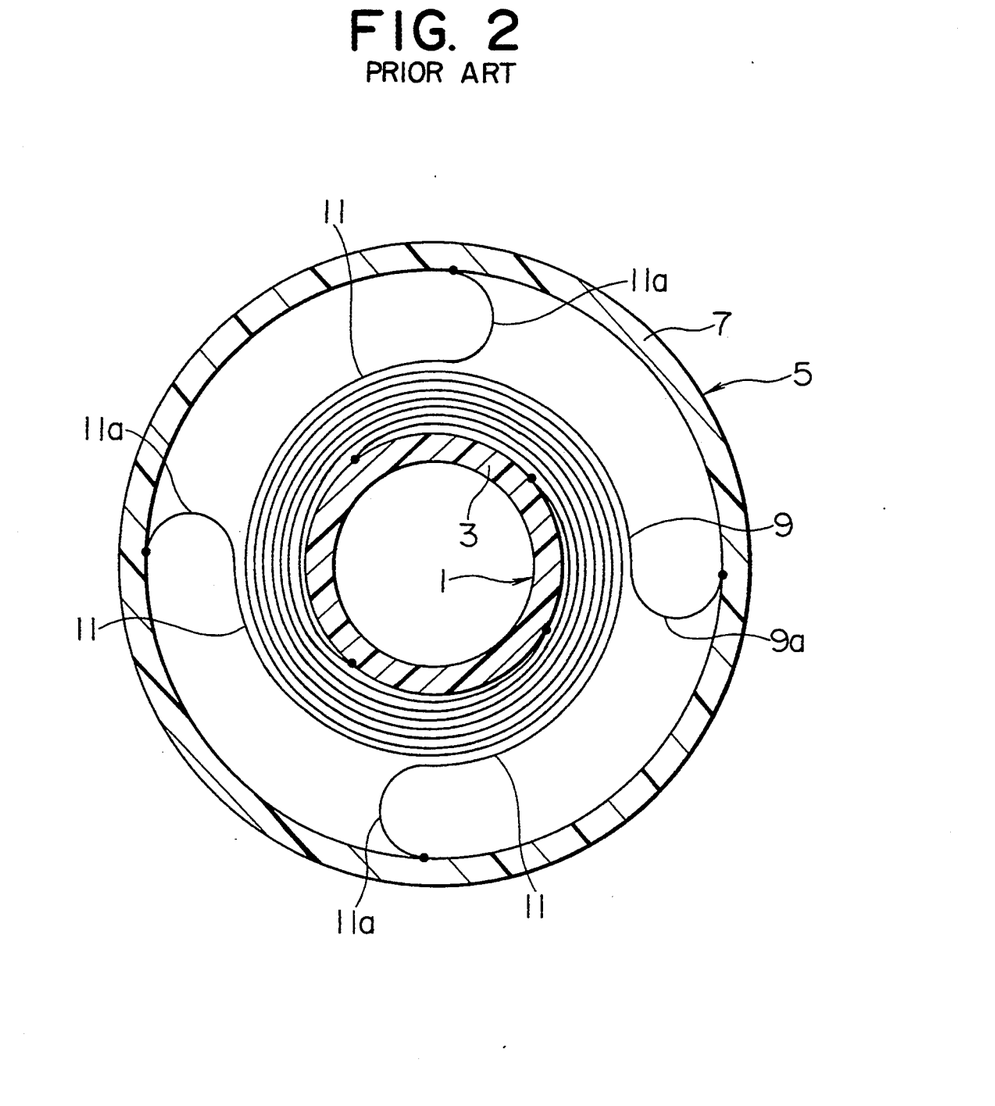
FIG. 2 is a lateral sectional view showing the state where the apparatus of FIG. 1 approaches the "over rotation in the winding direction"
Figure 3:
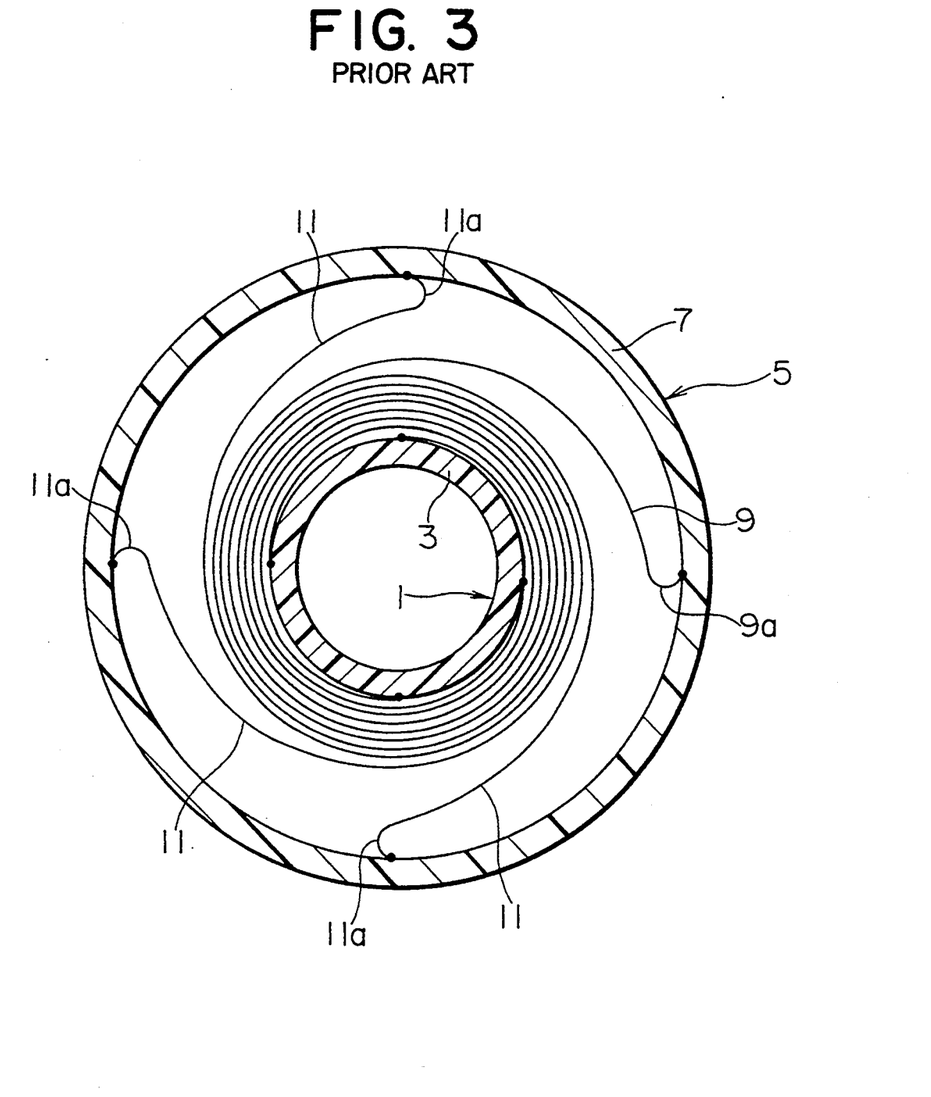
FIG. 3 is a lateral sectional view showing the state where the apparatus of FIG. 1 reaches the "over rotation in the winding direction"

FIG. 2 shows the state of substantially all of the flat cable 9 and the dummy cables 11 wound on the inner tubular portion 3 in this way. If the inner tubular portion 3 is rotated in the counterclockwise direction from the state of FIG. 2, the result is as shown in FIG. 3. The state of FIG. 3 is referred to as "over rotation in the winding direction". In this state, the winding direction inversion portions 9a and 11a of the flat cable and the dummy cables are greatly reduced in the radius of curvature. If the inner tubular portion 3 is rotated in the counterclockwise direction from this state, the radius of curvature finally becomes substantially zero and the cables are folded back.

When this state is reached, the flat cable 9 may be creased to undergo great stress on the inside conductors and cause breakage, thereby leading up to a total transmission failure. The dummy cables 11 will not be greatly damaged, but the creases given to them may obstruct subsequent rotary operations.

Figure 4:
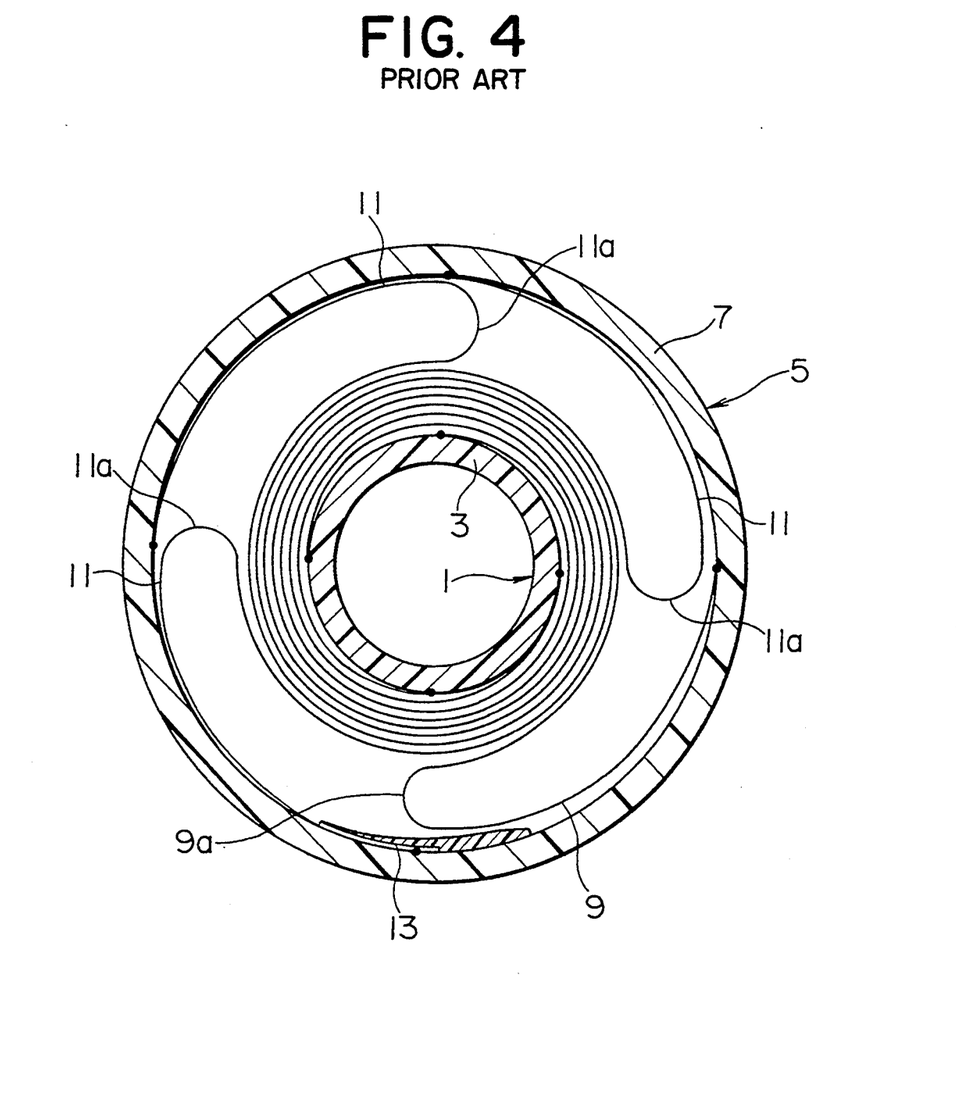
FIG. 4 is a lateral sectional view of a transmission apparatus given the usual measures against "over rotation in the winding direction"
Figure 5:
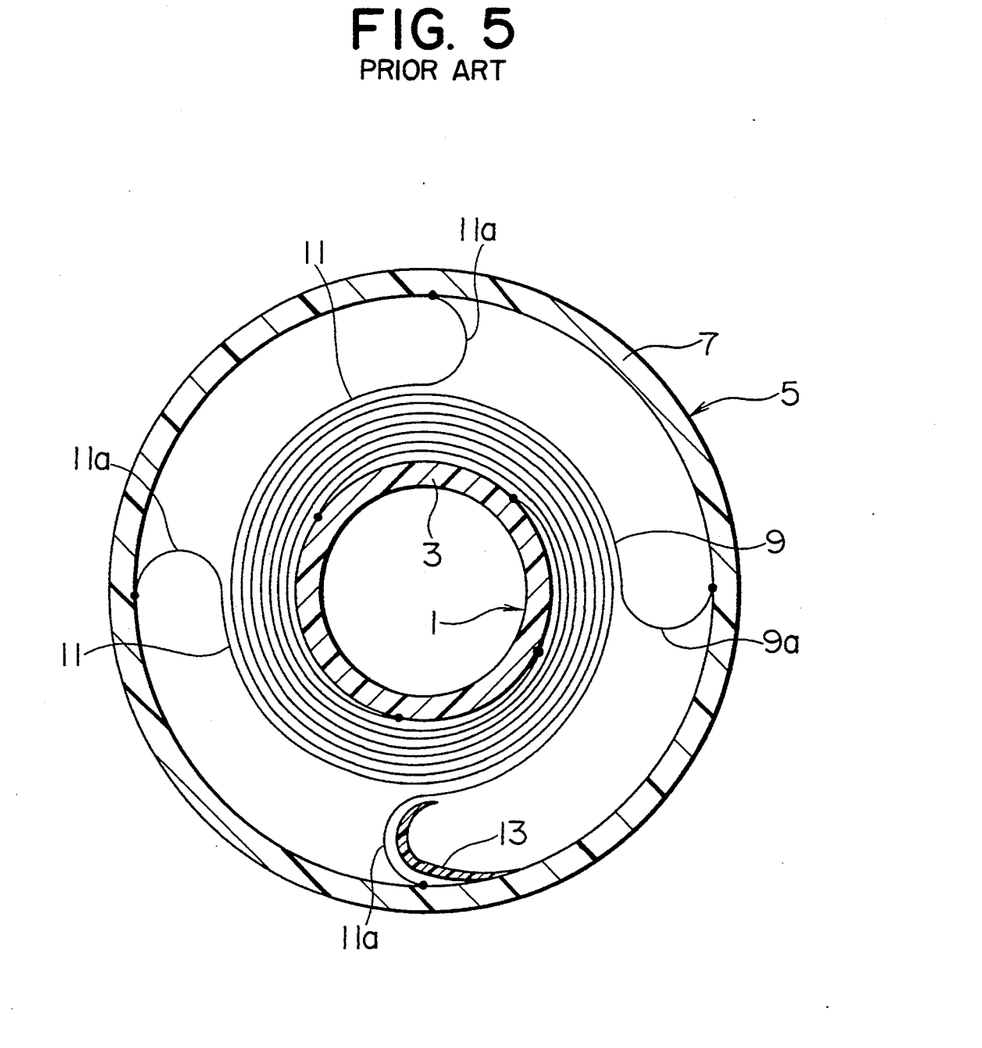
FIG. 5 is lateral sectional view showing the state where the apparatus given the measures shown in FIG. 4 reaches the "over rotation in the winding direction"

To prevent this, usually the following means have been considered. FIG. 4 shows an example of a countermeasure against "over rotation in the winding direction" and provides an example of provision of a tongue shaped support piece 13 on the inside surface of the outer tubular portion 7. The support piece 13 is affixed to the outer tubular portion 7 at its base end side. Its front end gradually becomes thinner and serves as the free end. By providing this support piece 13, when the state of "over rotation in the winding direction" is reached, since a large tension is applied to the flat cable 9 and the dummy cables 11, the support piece 13 is curved as shown in FIG. 5 by this tension, so the winding direction inversion portions 9a and 11a can be prevented from being curved down to or curved less than a certain radius.

Further, since the torque required for further rotating the inner tubular portion 3 in the same direction becomes much greater than this, the state of "over rotation in the winding direction" can be detected. Therefore, it is possible to take the necessary measures to prevent more than this rotation of the inner tubular portion 3 etc.

The above explanation was made regarding the case of provision of one support piece for one dummy cable, but a plurality of support pieces may also be provided for a plurality of dummy cables.

In this way, the "over rotation in the winding direction" can be dealt with by ordinary measures. Next, an explanation will be made of the opposite "over rotation in the rewinding direction".

Figure 6:
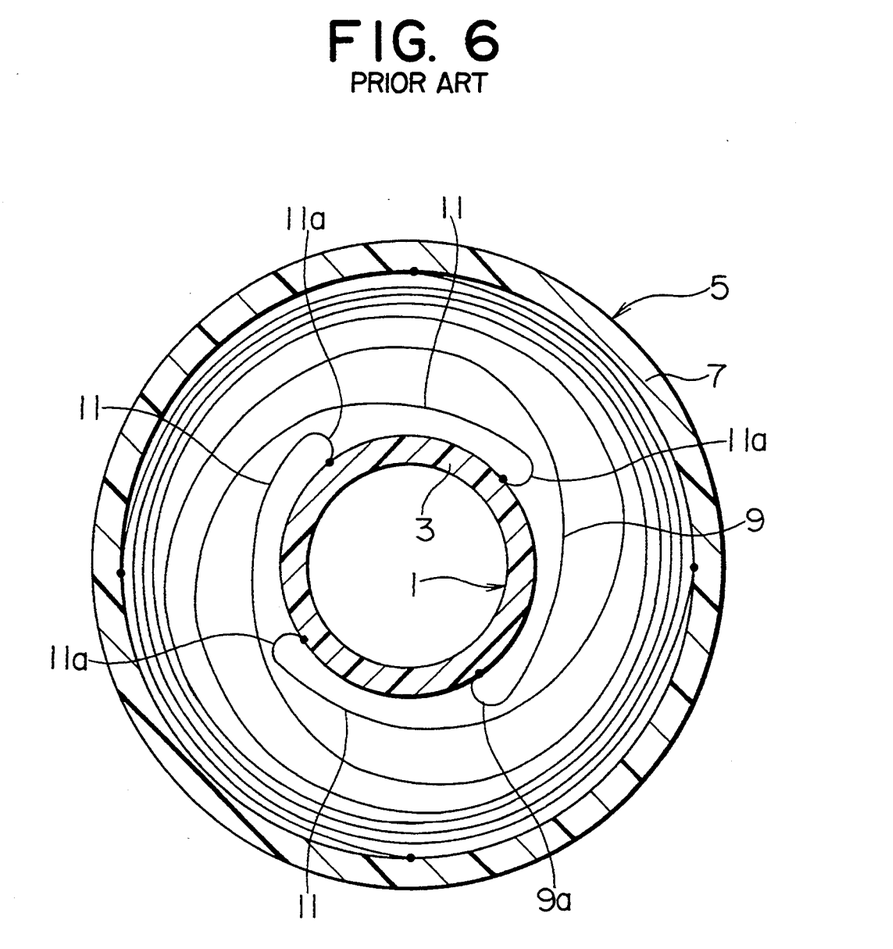
FIG. 6 is a lateral sectional view showing the state where the apparatus shown in FIG. 1 reaches the "over rotation in the rewinding direction"

After the inner tubular portion 3 is rotated in the clockwise direction from the state of FIG. 1 and the flag cable 9 and the dummy cables 11 which had been wound on the inner tubular portion 3 are almost all wound back, if the inner tubular portion 3 is further rotated in the clockwise direction, the state shown in FIG. 6 is reached. This is referred to as the "over rotation in the rewinding direction".

The winding direction inversion portions 9a and 11a of the flat cable 9 and the dummy cables 11 have shorter radii of curvature in this state for the same reason as the above-mentioned "over rotation in the rewinding direction". In this state, however, the flat cable 9 and the dummy cables 11 which had been wound on the inside of the outer tubular portion 7 are pulled to the inner tubular portion 3 side and become jammed in winding. The magnitude of the force for reducing the radius of the winding direction inversion portion and the force for causing the jamming in winding change independently of each other, so the state of the reduction of the radius of curvature and jamming of winding differ depending on the balance of these forces. Whatever the case, in the end, the radii of curvature of the winding direction inversion portions 9a and 11a of the flat cable and the dummy cables 11 become substantially zero and the conductors of the flat cable are damaged.

Figure 7:
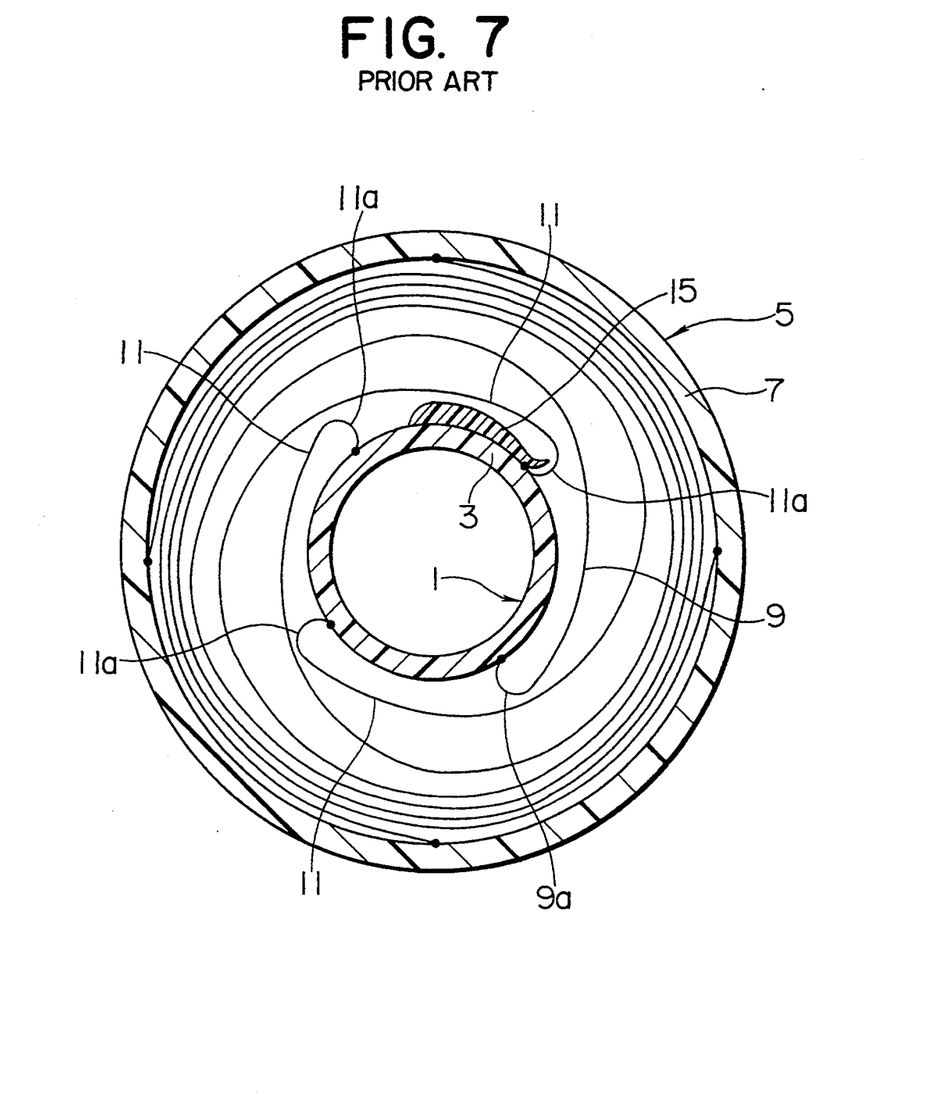
FIG. 7 is a lateral sectional view of a transmission apparatus given the usual measures against "over rotation in the rewinding direction"

FIG. 7 shows an example of application of the same measures as in the case of "over rotation in the winding direction" for the "over rotation in the rewinding direction". In this example, a support piece 15 is attached to the surface of the outer circumference of the inner tubular portion 3. For the support piece 15 to function in the same way as the case of the "over rotation in the winding direction", it is necessary that a large force be applied to the winding direction inversion portions 11a of the dummy cables along with the rotation of the inner tubular portion 3 in the clockwise direction and that the free end of the support piece 15 deform. But the force for pulling the flat cable 9 and the dummy cables 11 to the inner tubular portion 3 side is smaller than the force deforming the support piece 15 and therefore the flat cable 9 and the dummy cables 11 wound on the inside of the outer tubular portion 7 end up pulled to the inner tubular portion 3 side before the support piece 15 deforms much at all.

In view of the above, in the case of "over rotation in the rewinding direction", it was not possible to prevent damage to the conductors of the flat cable even with provision of the support piece 15.

SUMMARY OF THE INVENTION

The present invention was made in consideration of the above circumstances and has as its object the provision of a transmission apparatus between a rotary body and a fixed body which can prevent damage to a transmission cable due to over rotation of the rotary body.

The transmission apparatus of the present invention, to achieve the above-mentioned object, has an outside case having a flange portion and an outer tubular portion, an inside case having a flange portion and an inner tubular portion disposed at the inner circumference side of the outside case relatively rotatably with respect to the outside case, at least one flat cable with an inner end connected to the outer circumference of the inner tubular portion and an outer end connected to the inner circumference of the outer tubular portion and for transmitting signals between a rotary body and a fixed body, and at least one dummy cable with an inner end connected to the outer circumference of the inner tubular portion and an outer end connected to the inner circumference of the outer tubular portion at a different connecting position from the flat cable in the circumferential direction, the flat cable and the dummy cable forming winding direction inversion portions at portions midway in the longitudinal directions of the cables in the space defined by the outer tubular portion, inner tubular portion, and flange portions and further being wound up and housed so that the respective winding direction inversion portions are at similar intervals in the circumferential direction, a first stopper member having a projecting portion being provided on at least one dummy cable near a connection portion to the inner tubular portion, a first engagement groove housing the first stopper member being formed at the outer circumference of the inner tubular portion, and a first depression portion in which the projecting portion of the first stopper member enters when the first stopper member leaves the first engagement groove being formed at the inner circumference portion of the flange portion of the outside case.

In the transmission apparatus according to the present invention, when the inner tubular portion rotates relative to the outer tubular portion in the direction rewinding the flat cable and the dummy cable, the first stopper member leaves the first engagement groove before the flat cable is rewound to the end, the projecting portion of the first stopper member enters into the first depression portion, and the projecting portion is caught on the circumferential wall of the first depression portion, so it is possible to prevent more rotation in the rewinding direction. Therefore, it is possible to detect that the rotation state is reaching the "over rotation in the rewinding direction" so as not to damage the flat cable and the dummy cable.

Note that to detect that the rotation state is reaching the "over rotation in the winding direction", it is possible to use a support piece provided near the connection portion of the outer end of the dummy cable and the inner circumference of the outer tubular portion. Further, as another means, it is possible to use also a second stopper member (of a construction similar to the first stopper member) provided on the dummy cable near a connection portion to the inner circumference of the outer tubular portion.

DESCRIPTION OF THE PREFERRED EMBODIMENTS

Below, embodiments of the present invention will be explained in detail with reference to the drawings.

Figure 8:
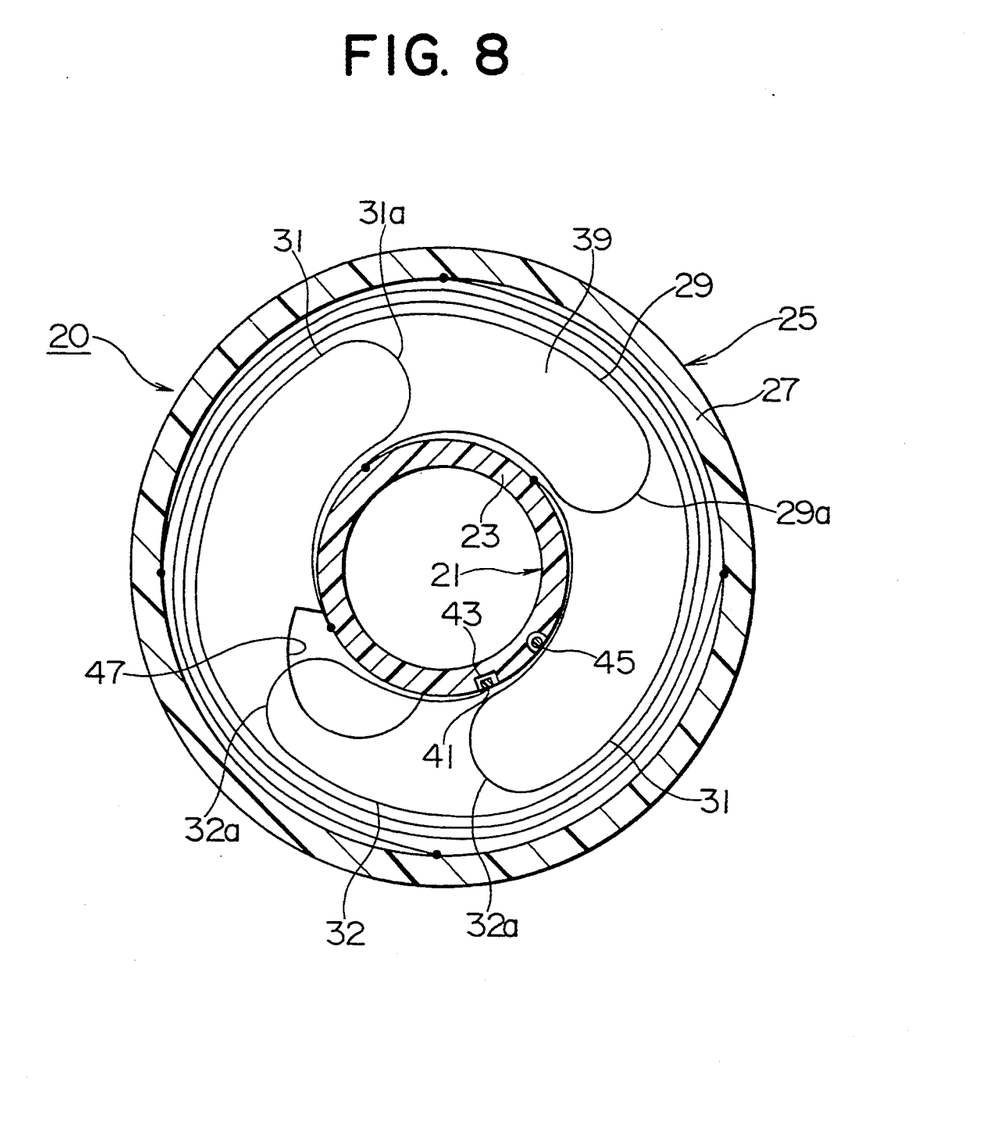
FIG. 8 is a lateral sectional view showing the process until the "over rotation in the rewinding direction" in the transmission apparatus between a rotary body and fixed body according to an embodiment of the present invention.
Figure 9:
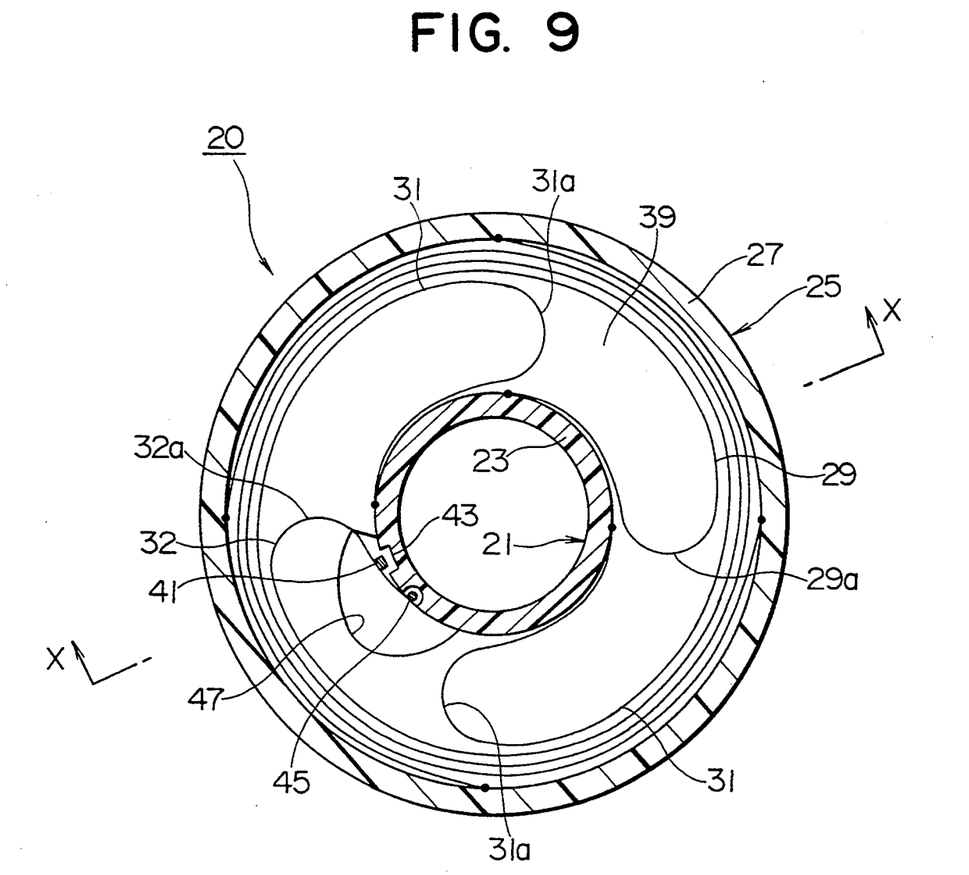
FIG. 9 is a lateral sectional view of a transmission apparatus showing the process of further rotation in the rewinding direction from the state shown in FIG. 8.
Figure 10:
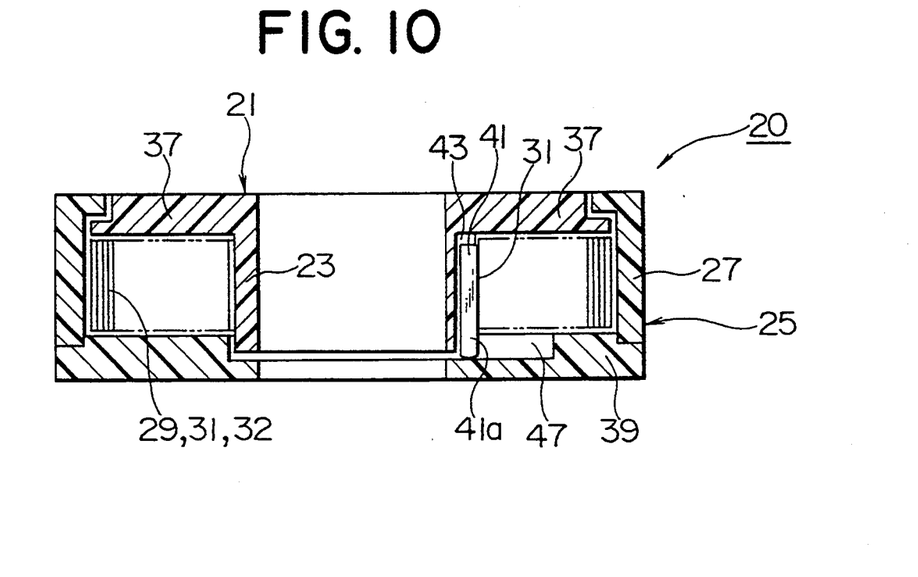
FIG. 10 is a sectional view along the line X—X in FIG. 9.

The transmission apparatus 20 according to an embodiment of the present invention, as shown in FIGS. 8 to 10, is provided at its center with an inside case 21 having an inner tubular portion 23 of a hollow cylindrical shape and an outer case 25 having an outer tubular portion 27 disposed coaxially at the outer circumference of the inner tubular portion 23.

As shown in FIG. 10, at the top end of the inner tubular portion 23 of the inside case 21 is integrally formed a top flange portion 37. This top flange portion 37 may be constructed separately from the inner tubular portion 23 or constructed integrally with the same. Further, at the bottom end of the outer tubular portion 27 of the outer case 25 is integrally connected a bottom flange portion 39. This bottom flange portion 39 can be formed integrally with respect to the outer tubular portion 27. The material used for constructing the inside case 21 and the outside case 25 is not particularly limited, but plastics is desirable from the viewpoint of reduction of weight.

The thus constructed inside case 21 and outside case 25 are joined together to be relatively rotatable. For example, at the inner circumference of the inner tubular portion of the inside case 21 is connected a rotary shaft, while at the outer tubular portion 27 of the outer case 25 is connected a fixed body.

In the space formed by the inside case 21 and the outside case 25, as shown in FIGS. 8 to 10, are wound and housed a single flat cable 29 and three dummy cables 31 and 32 so as to form winding direction inversion portions 29a, 31a, and 32a at intermediate portions in the longitudinal direction of the same. The winding direction inversion portions 29a, 31a, and 32a of the flat cable 29 and dummy cables 31 and 32 are disposed at substantially equal intervals in the circumferential direction.

The inner ends of the flat cable 29 and the dummy cables 31 and 32 are connected to the outer circumference of the inner tubular portion 23, while the outer ends are connected to the outer tubular portion 27. The flat cable 29 is a cable formed by sandwiching a plurality of parallel arranged conductors by two plastic films joined by an adhesive etc. and has a suitable flexural rigidity and bending elasticity. The flat cable 29 is a cable for transmitting signals (including electric power) between the relatively rotating inside case and outside case. The two ends are connected to the inner case 21 and the outer case 25 so as to enable electrical connection or optical connection.

On the other hand, the dummy cables 31 and 32 preferably are constructed by plastic tape having substantially the same flexural rigidity, bending elasticity, and external dimensions as the flat cable 29. These dummy cables 31 and 32 are provided as reinforcement so that the flat cable 29 does not become jammed during winding or slacken when the inside case 21 is relatively rotated with respect to the outside case 25.

By the use of the above-mentioned construction, the inside case 21 and the outside case 25 can be rotated relatively within the range of the rotations restricted by the length of the flat cable 29 and the dummy cables 31 and 32.

This transmission apparatus 20 can transmit signals etc. between a rotary body and a fixed body with a high reliability since for example the inside case 21 serving as the rotary body and the outer case 5 serving as the fixed body are connected by a flat cable having conductors inside it. Therefore, this type of apparatus is used for applications for transmitting electrical signals and optical signals between, for example, equipment on the body side of an automobile (fixed body) and equipment (air bag system etc.) on the steering wheel (rotary body) side.

In the above-mentioned transmission apparatus 20, the winding direction inversion portions 29a, 31a, and 32a are provided at the flat cable 29 and the dummy cables 31 and 32 and therefore it is possible to reduce the length of cable required for obtaining the same number of rotations than in the case of winding these cables in one direction.

In the apparatus 20 of the embodiment, a first stopper member 41 is attached on the dummy cable 32 of the three dummy cables 31 and 32 near a connection portion to the inside case 21. A first engagement groove 43 where the first stopper member 41 enters is formed at the inner tubular portion 23. Further, the dummy cable 32 with the first stopper member 41 attached has a shorter length than the other dummy cables 31 and the flat cable 29. Also, the inner end of the other dummy cable 32 is supported by a support shaft 45 on the inner tubular portion 23 so as to be able to change in direction.

The inner ends and the outer ends of the dummy cables 31, not the dummy cable 32, and the flat cable 29 are affixed to the inner tubular portion 23 and the outer tubular portion 27 by an adhesive or other fixing means without the use of the support shaft 45.

Figure 11:
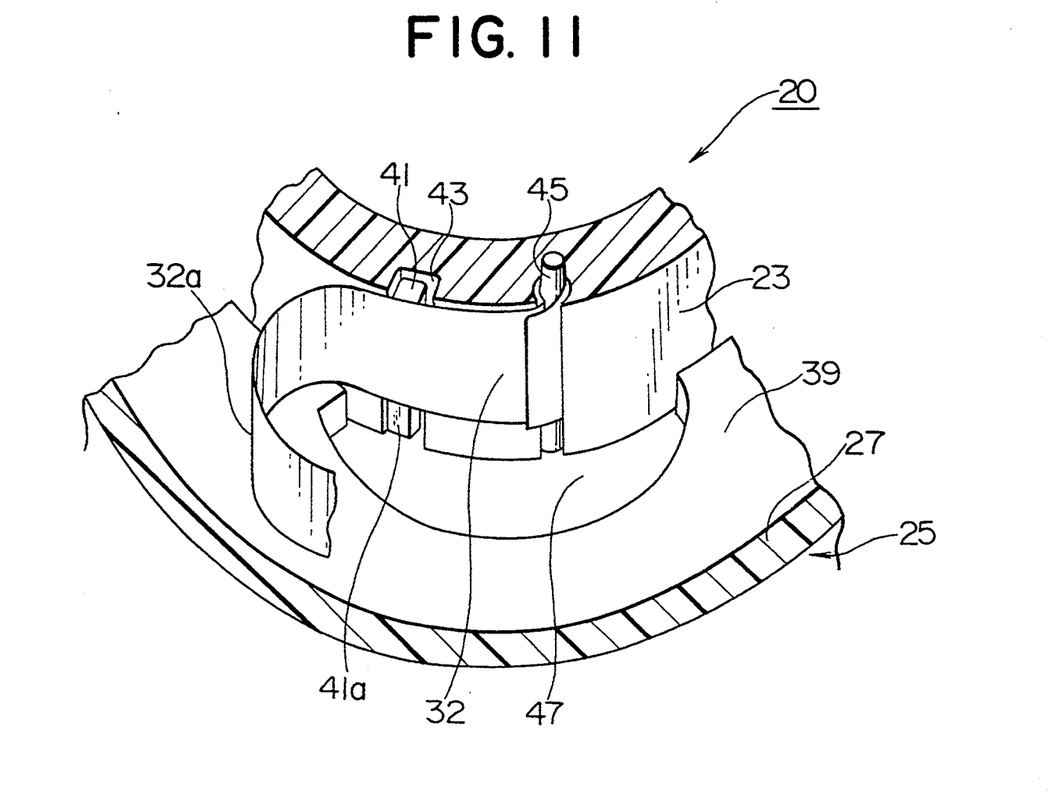
FIG. 11 is a perspective view of key portions of the transmission apparatus in the state shown in FIG. 9 and FIG. 10.

The first stopper member 41, as shown in FIGS. 10 and 11, has a projecting portion 41a projecting to the flange portion 39 side of the outside case 25. At the inner circumferential portion of the flange portion 39 is formed a first depression portion 47 in which the projecting portion 41a of the first stopper member 41 enters when the inner end of the dummy cable 32 changes in direction around the support shaft 45. Note that the support shaft 45 may itself be attached rotatably to the inner tube 23, but the construction may also be one where the support shaft 45 itself does not rotate, but the inner end of the dummy cable 32 rotates about the support shaft 45.

Note that in the above example, the explanation was made of one flat cable 29 and three dummy cables 31 and 32, but the number of cables may be suitable changed.

Next, an explanation will be made of the mode of operation of the transmission apparatus according to the present invention.

When the flat cable 29 and the dummy cables 31 and 32 are rewound from the intermediate state where the flat cable 29 and dummy cables 31 and 32 are wound equally on the outer circumference of the inner tube 23 and the outer circumference of the outer tube 27 (for example, the state of FIG. 1, however, FIG. 1 showing a lateral sectional view of a conventional transmission apparatus) by rotating the inner tubular portion 23 in the clockwise direction, the state shown in FIG. 8 is reached slightly before the rewinding limit is reached. If the inner tubular portion 23 is rotated further in the clockwise direction from this state, the state shown in FIG. 9 is reached, where the first stopper member 41 leaves the first engagement groove 43 and the projecting portion 41a of the first stopper member 41 enters the first depression portion 47 formed in the bottom flange portion 39.

Figure 12:
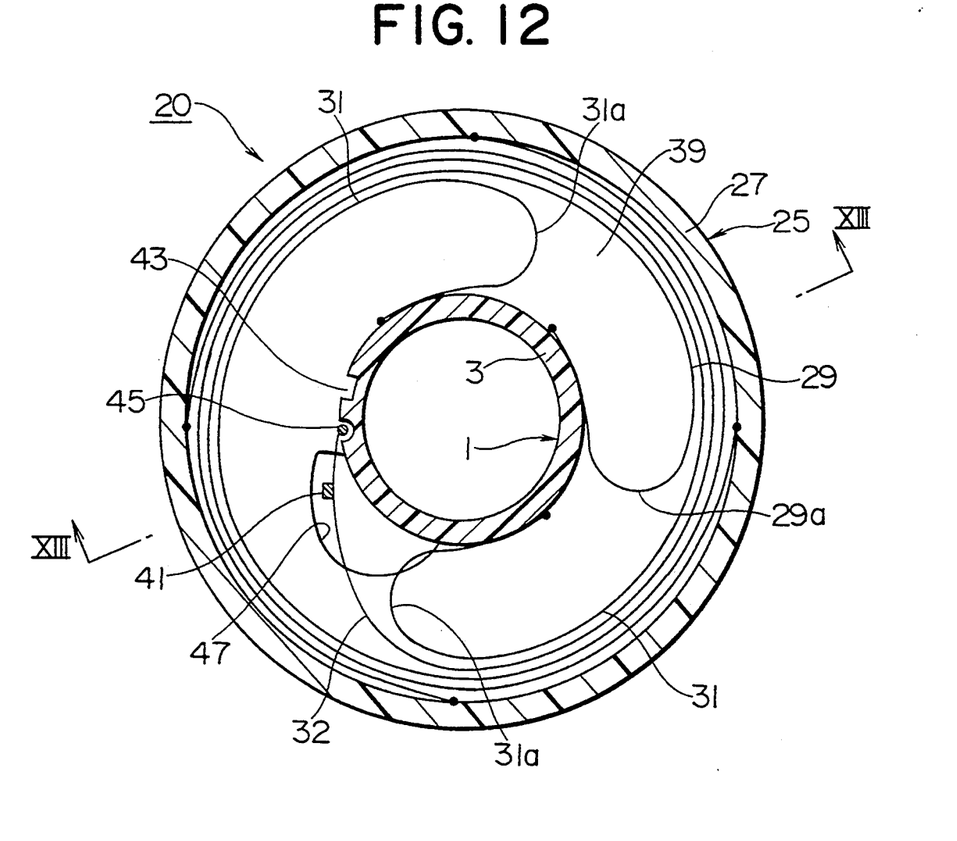
FIG. 12 is a lateral sectional view of a transmission apparatus showing the state of further rotation in the rewinding direction from the state shown in FIG. 9.
Figure 13:
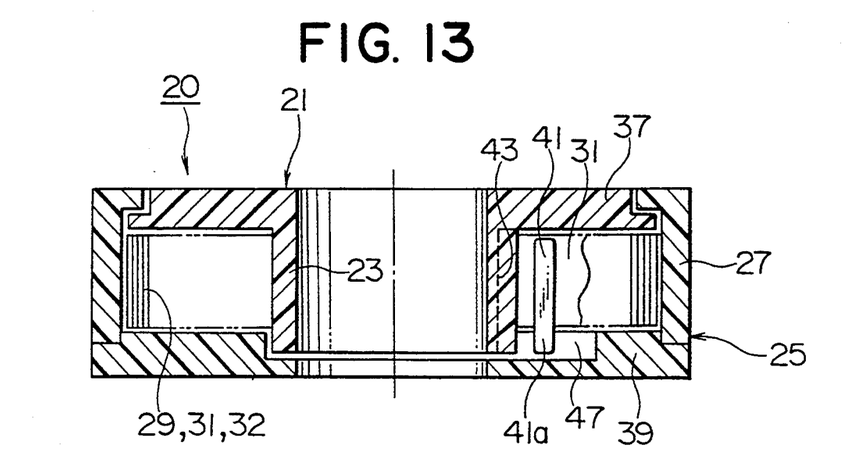
FIG. 13 is a sectional view along the line XIII—XIII in FIG. 12.
Figure 14:
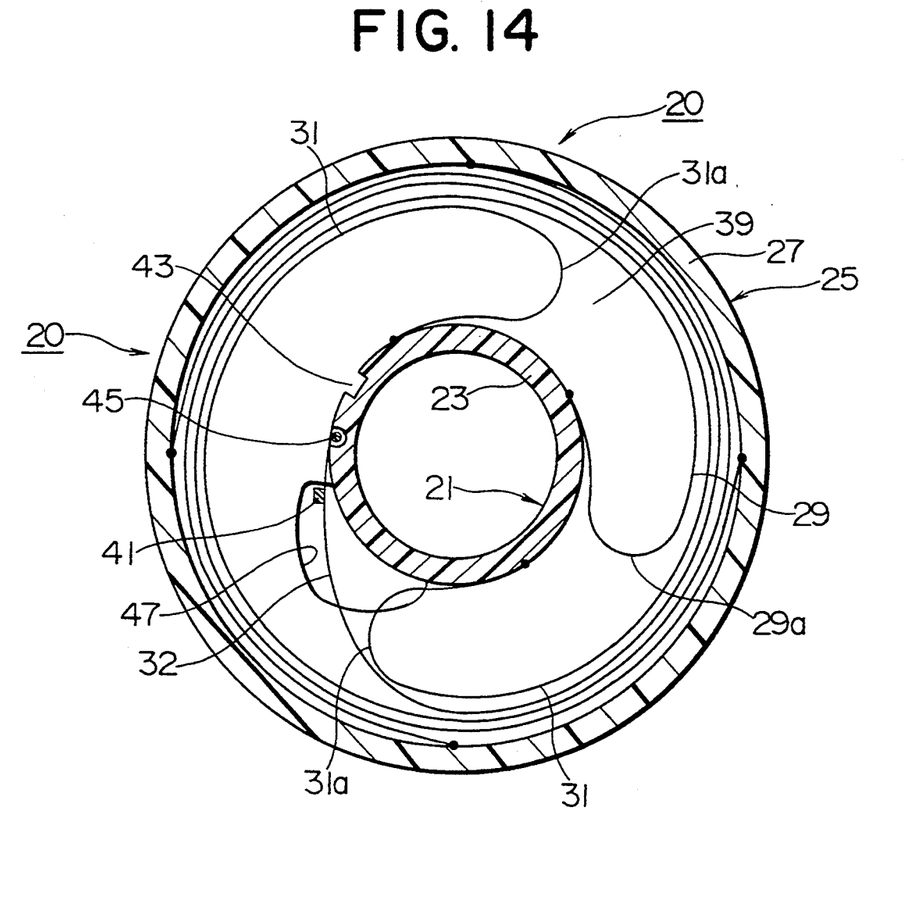
FIG. 14 is a lateral sectional view of a transmission apparatus showing the state of further rotation in the rewinding direction from the state shown in FIG. 12.

When the inner tubular portion 23 is further rotated in the clockwise direction, since the dummy cable 32 with the first stopper member 41 is shorter in length, the inner end changes in direction and the state shown in FIGS. 12 and 13 is reached. If the inner tubular portion 23 is rotated further in the clockwise direction, the state of FIG. 14 is reached, where the projecting portion 41a of the stopper member 41 catches the peripheral wall of the first depression portion 47, whereupon the inner tubular portion 23 is no longer able to rotate further. This is the state of the "over rotation in the rewinding direction". In this state, there is still leeway in the other dummy cables 31 and the flat cable 29 until the rewinding limit, so the winding direction inversion portions 29a and 31a are not reduced in the radius of curvature. Therefore, there is never damage to the conductors of the flat cable 29.

As explained above, the apparatus 20 can detect the occurrence of "over rotation in the rewinding direction" without damage to the flat cable 29 and the dummy cables 31 and therefore when "over rotation in the rewinding direction" occurs, the inner tubular portion 23 cannot be rotated further.

Figure 15:
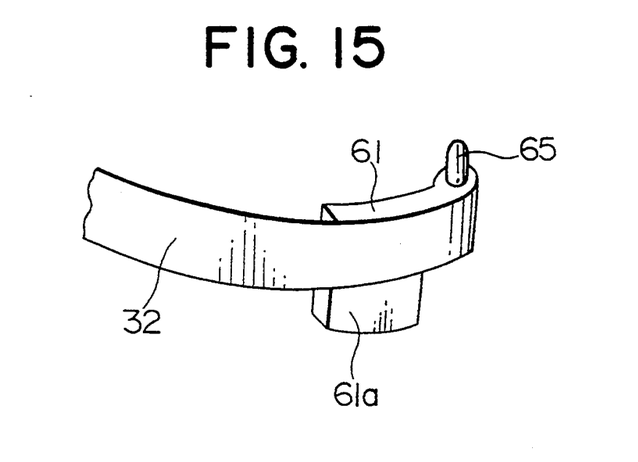
FIG. 15 is a perspective view of a stopper member used in the transmission apparatus according to another embodiment of the present invention.

Note that in the above-mentioned embodiment, the first stopper member 41 is constructed of a rod material, but as shown in FIG. 15, it is also possible to construct the stopper member 61 having the projecting portion 61a by a sheet member and to form the support shaft 65 integrally with the stopper member 61.

Next, an explanation will be made of another embodiment of the present invention referring to FIGS. 16 and 17. In the transmission apparatus 20a according to this embodiment, use is made of a similar construction as in the above embodiment as a measure against "over rotation in the winding direction".

That is, in the apparatus 20a, a second stopper member 51 is attached on the dummy cable 32 among the three dummy cables 31 and 32 near a connection portion to the outside case 25. At the outer tubular portion 27 is formed a second engagement groove 53 in which the stopper member 51 enters. Further, the dummy cable 32 to which the second stopper member 51 is attached is shorter in length than the other dummy cables 31 and the flat cable 29. In addition, the outer end of the dummy cable 32 is rotatably supported by a support shaft 55 on the outer tubular portion 27 so as to be able to change in direction, Further, the second stopper member 51, as shown in FIG. 17, has a projecting portion 51a which projects to the top flange portion 37 side of the inside case 21. At the outer circumference of the flange portion 37 is formed a second depression portion 57 in which enters the projecting portion 51a of the second stopper member 51 when the inner end of the dummy cable 32 changes direction.

Figure 16:
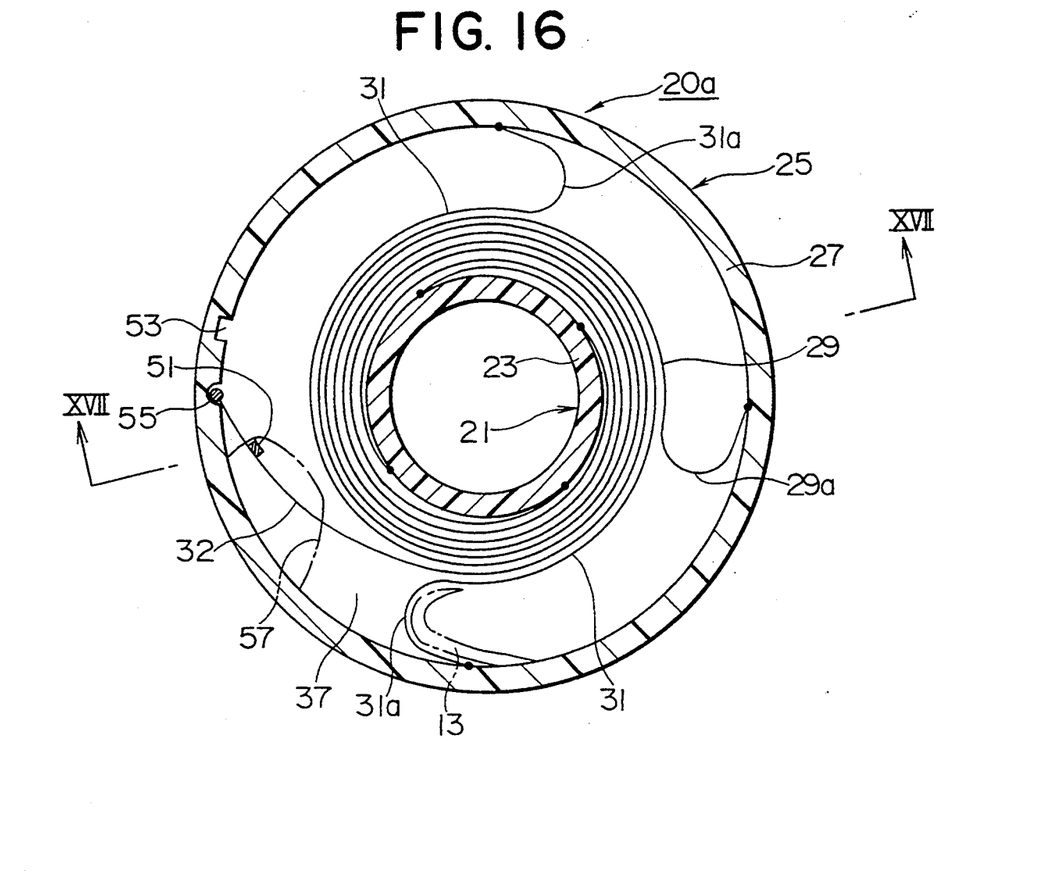
FIG. 16 is a lateral sectional view of a transmission apparatus according to still another embodiment of the present invention.
Figure 17:
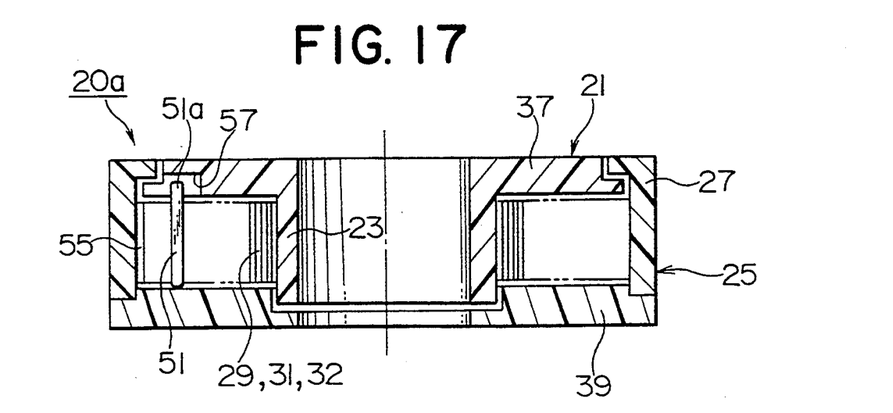
FIG. 17 is a sectional view along the line XVII—XVII in FIG. 16.

FIG. 16 shows the state of "over rotation in the winding direction". The operation up to here is similar to that of the above embodiment. In the state of FIG. 16, the projecting portion 51a of the second stopper member 51 catches the peripheral wall of the second depression portion 57 so the inner tubular portion 23 cannot rotate further. In this state, further, there is still leeway in the other dummy cables 31 and the flat cable 29 until the winding limit and the radii of curvature of the winding direction inversion portions 29a and 31a are not reduced. Therefore, the conductors of the flat cable 29 are not damaged.

Note that while omitted in illustration, the measures for "over rotation in the rewinding direction" are the same as those of the above embodiment.

In the above embodiments, a single stopper member was attached to a single dummy cable, but when there are a plurality of dummy cables, it is also possible to attach a stopper member to a plurality of dummy cables. In the case of such an embodiment, the reliability with respect to prevention of over rotation can be further improved.

Further, as another embodiment of the present invention, to prevent "over rotation in the winding direction", as shown in FIG. 16, it may be considered to provide a support piece 13 having elasticity on the outside case 25 near a connection portion of the outer end of a dummy cable 31 having the same length as the flat cable 29 and the inner circumference of the outer tubular portion 27. In the case of this embodiment, when rotating relatively in the direction for winding up the flat cable 29 and the dummy cable 31, before the flat cable 29 is completely wound up, the front end of the support piece 13 is elastically bent along the winding direction inversion portion 31a of the dummy cable 31 so as to stop further rotation in the winding direction. Note that in this embodiment, the measures for "over rotation in the rewinding direction" are the same as the embodiment shown in FIGS. 8 to 15.

I claim:

1. A transmission apparatus between a rotary body and a fixed body comprising:
   an outside case having a flange portion and an outer tubular portion,
   an inside case having a flange portion and an inner tubular portion disposed at the inner circumference side of said outside case and rotatable with respect to said outside case,
   at least one flat cable with an inner end connected to the outer circumference of the inner tubular portion and an outer end connected to the inner circumference of the outer tubular portion and for exchanging signals between a rotary body and a fixed body, and at least one dummy cable with an inner end connected to the outer circumference of the inner tubular portion and an outer end connected to the inner circumference of the outer tubular portion at different connecting positions from connecting positions of said flat cable in the circumferential direction, said flat cable and said dummy cable forming winding direction inversion portions at portions midway in the longitudinal directions of the cables in the space defined by the outer tubular portion, inner tubular portion, and flange portions and further being wound up and housed so that the respective winding direction inversion portions are at intervals in the circumferential direction, a first stopper member having a projecting portion being provided on said at least one dummy cable near a said connection portion to the inner tubular portion, a first engagement groove housing the first stopper member being formed at the outer circumference of the inner tubular portion, and a first depression portion in which the projecting portion of the first stopper member enters when the first stopper member leaves the first engagement groove being formed at the inner circumference portion of the flange portion of the outside case.

2. The transmission apparatus between a rotary body and a fixed body as set forth in claim 1, wherein at least one dummy cable other than the dummy cable having the first stopper member have a length equal to said flat cable and the dummy cable having the first stopper member has a length shorter than the flat cable.

3. The transmission apparatus between a rotary body and a fixed body as set forth in claim 1, wherein the inner end of the dummy cable having the first stopper member is connected rotatably to the outer circumference of the inner tubular portion through a support shaft.

4. The transmission apparatus between a rotary body and a fixed body as set forth in claim 1, wherein the first stopper member is a thin rod member extending at a substantial right angle to the longitudinal direction of the dummy cable to which the first stopper member is attached and wherein the bottom end of the rod member has a projecting portion projecting with respect to the dummy cable.

5. The transmission apparatus between a rotary body and a fixed body as set forth in claim 1, wherein a support piece having elasticity is attached on the inner circumference of the outer tubular portion near a connection portion between an outer end of the dummy cable and the inner circumference of the outer tubular portion and wherein when the inner tubular portion rotates relative to the outer tubular portion in the direction winding the flat cable and the dummy cables, the front end of the support piece elastically bends along the winding direction inversion portion of the dummy cable before the flat cable is completely wound up so as to stop further rotation in the winding direction.

6. The transmission apparatus between a rotary body and a fixed body as set forth in claim 1, wherein a second stopper member having a projecting portion is attached on the dummy cable near a connection portion to the inner circumference of the outer tubular portion, a second engagement groove accommodating the second stopper member is formed at the inner circumference of the outer tubular portion, and a second recessed portion in which the projecting portion of the second stopper member enters when the second stopper member leaves the second engagement groove is formed in the outer circumference of the flange portion of the inside case.

7. A transmission apparatus between a rotary body and a fixed body comprising:

an outside case having a flange portion and an outer tubular portion, an inside case having a flange portion and an inner tubular portion disposed at the inner circumference side of said outside case and rotatable with respect to said outside case, at least one flat cable with an inner end connected to the outer circumference of the inner tubular portion and an outer end connected to the inner circumference of the outer tubular portion and for exchanging signals between a rotary body and a fixed body, and at least one dummy cable with an inner end connected to the outer circumference of the inner tubular portion and an outer end connected to the inner circumference of the outer tubular portion at different connecting positions from connecting positions of said flat cable in the circumferential direction, said flat cable and said dummy cable forming winding direction inversion portions at portions midway in the longitudinal directions of the cables in the space defined by the outer tubular portion, inner tubular portion, and flange portions and further being wound up and housed so that the respective winding direction inversion portions are at intervals in the circumferential direction, a second stopper member having a projecting portion being provided on the dummy cable near a said connection portion to the inner circumference of the outer tubular portion, a second engagement groove accommodating said second stopper member is formed in the inner circumference of the outer tubular portion, and a second depression portion in which the projecting portion of the second stopper member enters when the second stopper member leaves the second engagement groove is formed in the outer circumference of the flange portion of the inside case.

8. The transmission apparatus between a rotary body and a fixed body as set forth in claim 7, wherein at least one dummy cable other than the dummy cable having the second stopper member have a length equal to the flat cable and the dummy cable having the second stopper member has a length shorter than the flat cable.

9. The transmission apparatus between a rotary body and a fixed body as set forth in claim 7, wherein the outer end of the dummy cable having the second stopper member is connected rotatably to the inner circumference of the inner tubular portion through a support shaft.

10. The transmission apparatus between a rotary body and a fixed body as set forth in claim 7, wherein the second stopper member is a thin rod member extending at a substantial right angle to the longitudinal direction of the dummy cable to which the second stopper member is attached and wherein the bottom end of the rod member has a projecting portion projecting with respect to the dummy cable.

* * * * *